June 1, 1965     J. A. WADDELL     3,186,051
TUBE CLAMP
Filed Jan. 2, 1964
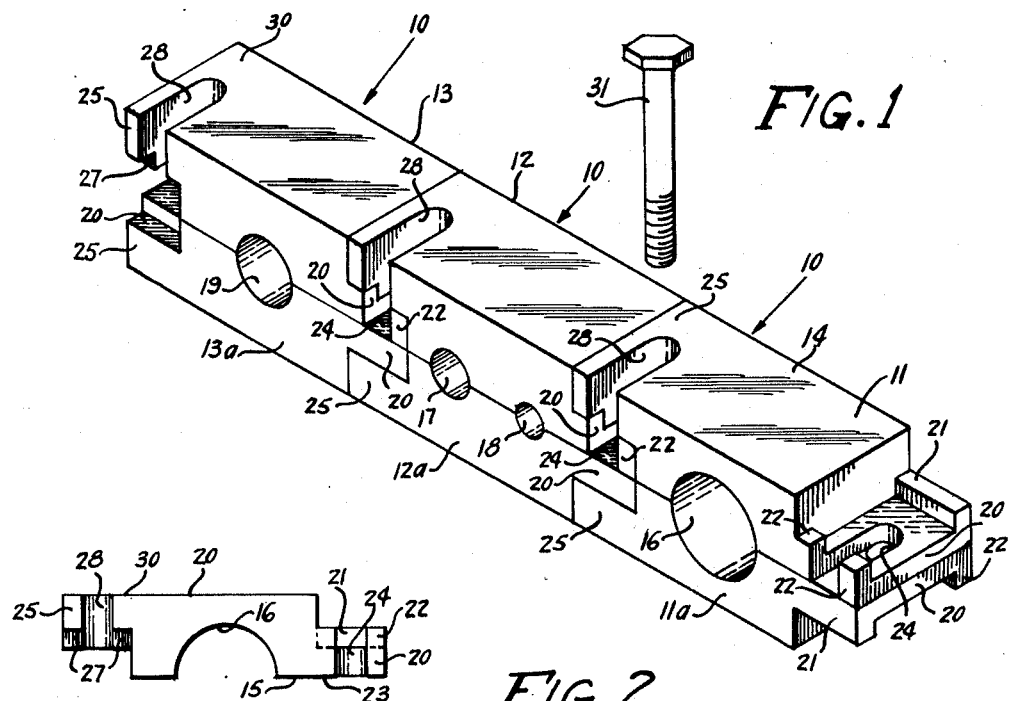
FIG.1
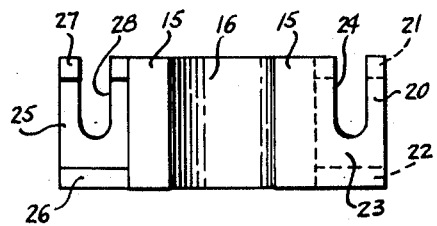
FIG.3
FIG.4
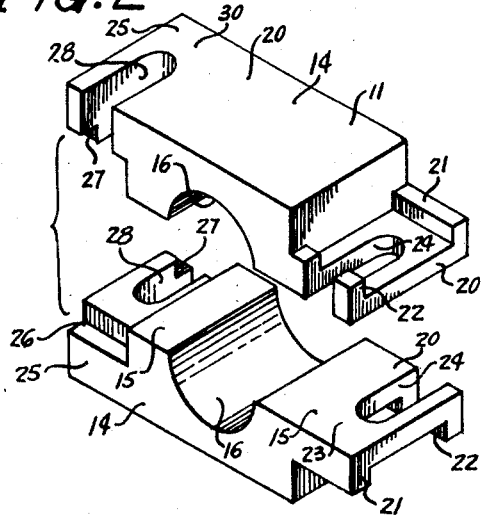
FIG.2
INVENTOR.
JESSIE A. WADDELL
BY
Kimmel & Crowell
ATTORNEYS.

United States Patent Office 3,186,051
Patented June 1, 1965

3,186,051
TUBE CLAMP
Jessie A. Waddell, 1314 Gallatin Road,
South Madison, Tenn.
Filed Jan. 2, 1964, Ser. No. 335,023
3 Claims. (Cl. 24—125)

This invention relates to a tube clamp and has as its primary object the provision of an improved device for clamping together in alignment a relatively large number of tubes of the same or different diameter.

An additional object of this invention is the provision of such a clamp which may be connected in multiples, and wherein any individual unit may be readily removed without disturbing the remainder of the assembly for the purpose of replacing or repairing an individual pipe or the like.

An additional object of the invention is the provision of a tube clamp of this character which is comprised of two complementary identical halves, so arranged that each component may be interchanged with each other component.

A further object of the invention is the provision of a device of this character wherein the unit comprising an individual clamp may be readily cast or molded with a minimum of effort and difficulty.

As conducive to a clearer understanding of this invention, it may here be pointed out that many industrial plants and factories use some type of pneumatic control system which may consist of hundreds of tubing lines running from the field to the control building. In many instances the tubing lines are installed as compactly as possible, resulting in a large number of lines running parallel to one another in a very small area. For stability and permanency it is necessary to anchor these lines every few feet. This time consuming and costly installation is reduced by the use of the instant tube clamp, which can be installed rapidly, provide an adequate anchor for the tubing, and allow large numbers of tubing lines to be tied together into a compact unit.

Additionally, the clamp of the instant invention may be readily removed without dismantling the entire tubing assembly. While the clamp of the instant invention holds many tube lines in a compact unit, any tube in any position within the band or rack can easily be removed for repair or replacement.

Still other objects of the invention reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a perspective view of a plurality of individual clamp units arranged in aligned end to end relation, a connecting bolt for the units being shown in this associated position.

FIGURE 2 is a perspective view of a tube clamp comprised of two complementary units.

FIGURE 3 is a side elevational view of one unit, and

FIGURE 4 is a plan view of a unit taken from the confronting face thereof.

Similar reference characters refer to similar parts throughout the several views of the drawing.

Having reference now to the drawings in detail, there is generally indicated at 10 three individual clamping units, positioned in end to end aligned relation, and each comprising complementary top and bottom sections 11 and 11a, 12 and 12a, and 13 and 13a. Each of these sections is identical, with the exception of the side tube or tubes which it is adapted to accommodate, all as will be more fully pointed out hereinafter.

Each individual unit, as for example, unit 11 and 11a is comprised of a substantially block like member 14, each member being provided with a confronting face 16 in which is cut a transverse semi-circular opening 16, the arrangement being such that when the confronting faces are juxtaposed the aligned opening 16 will provide a tubular space for clamping about a pipe. The unit 11, 11a will, for example, accommodate a relatively large pipe. The unit 12, 12a will accommodate two relatively small pipes of different diameters through openings 17 and 18 while the unit 13, 13a will accommodate an intermediate single pipe through the opening 19. Obviously, the side opening or openings may be varied as the occasion demands. Opposite and parallel to each confronting face is an opposite or outer face 20, the outer or opposite faces of each unit being substantially smooth.

At one end of each block there is provided a tongue 20 which has inwardly extending marginal flanges 21 and 22, the tongue 20 and its associated flanges being of a height substantially equal to that of half the block. The tongue 20 has a smooth upper face 23 which is substantially flush with a confronting face 15, and is provided with an elongated transverse slot 24 which opens laterally through the flange 22 and which extends entirely through the tongue. The length of the flange is in excess of half the width of the tongue.

At the opposite end of each block is a second flange 25, which is provided with cutaway corner portions 26 and 27, and which is also provided with a laterally extending slot 28 which opens through the side of the flange, and through the cutaway portion 27. The slots 28 are also of a length in excess of half the width of the flange. Flanges 25 are provided with smooth faces 30 which are flush with the outer or opposite faces 14 of each block. It will thus be seen that when two of the blocks are juxtaposed with their confronting faces lying in confronting relation, that the adjacent tongues 20 present a projecting flanged male member at one end, while the spaced apart flanges 25 present a female member at the opposite end. The cutaway portions 26 and 27 are adapted to receive the flanges 21 and 22, respectively, so that the slots 28 of the confronting pieces open from opposite sides of the assembly, as do the confronting or superposed slots 24. Each of the slots has a rounded extremity, and when the rounded extremities are presented in an opopsite relation, the juncture of the slots presents a substantially circular bolt hole which is adapted for the reception of a securing bolt 31.

A multiplicity of the clamps or units 10 may thus be aligned as shown in FIGURE 1, with the bolt 31 extended through the bolt hole, and by means of a conventional nut (not shown) a bolt will connect each unit with its adjacent unit in relatively tight relation. When it is desired to remove an individual unit it is merely necessary to remove the bolt at each end, whereupon the male member comprised of a juxtaposed tongue 20 may be readily removed from its associated female member comprised of the spaced flanges 25 by sliding one-half of the assembly in one direction, and the other half of the assembly in the opposite direction to clear the ends of its associated block.

It is not necessary to completely remove the bolts 31 if disassembly of the entire device is not desired. By merely loosening the nuts on the bolts, the top half section may be raised sufficiently in order to slip the clamp out from around the tube to be removed.

It will also be understood that the clamps of the instant invention may be made without the slotted holes where extra strength is needed at the ends of the same.

By virtue of the instant invention it will be seen that a relatively large number of clamps or units may be connected in aligned relation for any desired number of tubes, and that the sizes of tube clamps may be readily affected by the control of the sizes of the openings 16, 17, 18, and 19.

Similarly, individual units or rows of units may be superposed on top of each other, merely by the substitution of longer bolts for the bolts 31.

From the foregoing it will now be seen that there is herein provided an improved tube clamp which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A tube clamp comprised of a pair of identical half sections, each section comprising a generally rectangular block have a smooth confronting face with at least one semi-circular opening therein whereby, when said confronting faces are juxtaposed, at least one circular tube clamping opening is provided, and a smooth opposite face, a tongue of approximately one-half of the thickness of the block having a smooth face aligned with the smooth confronting face of the block extending from one end of the block, said tongue having marginal ridges along each side, and a transverse bolt receiving slot extending through said tongue in and opening through one of said ridges through the side thereof, a second tongue having a smooth face aligned with the smooth opposite face of the block and having marginal grooves along each side for the reception of the ridges of an aligned tongue in an adjacent block, said second tongue having a transverse slot extending therethrough intersecting one of said grooves, and opening through the side of the tongue in the same direction as the bolt receiving slot in the other tongue, whereby when two of said blocks are juxtaposed to align the semi-circular openings through the slots both tongues of one section open through the same side of the assembly and both tongues of the confronting section open through the opposite side of the assembly, each slot being of a length in excess of half the width of its associated tongue whereby when the opposite sections are juxtaposed bolt holes are formed through the aligned slots, the tongues having smooth faces aligned with the confronting faces lying together to form a male member and the tongues having smooth faces aligned with the opposite faces of the block being spaced apart to form a female member for receiving the male member of an adjacent clamp, the bolt holes in said male and female members being aligned when adjacent members are interfitted.

2. The structure of claim 1 including a multiplicity of clamps connected in rows in end to end relation by bolts extended through the aligned bolt holes in the interfitted male and female members.

3. The structure of claim 2 wherein a plurality of rows are superposed one on top of the other by bolts of a length to extend through a plurality of superposed male and female members.

References Cited by the Examiner
UNITED STATES PATENTS

| | | | |
|---|---|---|---|
| 770,278 | 9/40 | Fletcher | 174—155 |
| 2,179,516 | 11/39 | Patrick | 24—125 |
| 2,327,048 | 8/43 | Joyce | 339—198 |
| 2,356,318 | 8/44 | Hayman | 24—135 |
| 2,425,033 | 8/47 | Fletcher | 248—68 |

DONLEY J. STOCKING, *Primary Examiner.*

BOBBY R. GAY, *Examiner.*